United States Patent
Anikin et al.

(10) Patent No.: US 10,003,931 B2
(45) Date of Patent: Jun. 19, 2018

(54) METHOD FOR RETRIEVAL OF UNRECALLED INFORMATION FROM DIGITAL ADVERTISEMENT

(71) Applicants: Sergey Anikin, Redwood City, CA (US); Irina Anikina, Redwood City, CA (US)

(72) Inventors: Sergey Anikin, Redwood City, CA (US); Irina Anikina, Redwood City, CA (US)

(73) Assignee: INTAP, Redwood City, CA (US)

( * ) Notice: Subject to any disclaimer, the term of this patent is extended or adjusted under 35 U.S.C. 154(b) by 0 days. days.

(21) Appl. No.: 15/497,118

(22) Filed: Apr. 25, 2017

(65) Prior Publication Data

US 2017/0318437 A1   Nov. 2, 2017

Related U.S. Application Data (60) Provisional application No. 62/328,454, filed on Apr. 27, 2016.

(51) Int. Cl.

| | |
|---|---|
| *G06F 3/00* | (2006.01) |
| *G06Q 10/08* | (2012.01) |
| *H04W 4/06* | (2009.01) |
| *H04W 4/02* | (2018.01) |
| *H04W 4/18* | (2009.01) |
| *G06K 9/62* | (2006.01) |
| *G06F 17/30* | (2006.01) |
| *H04W 4/20* | (2018.01) |

(52) U.S. Cl.
CPC .......... *H04W 4/06* (2013.01); *G06F 17/3082* (2013.01); *G06K 9/6215* (2013.01); *H04W 4/023* (2013.01); *H04W 4/185* (2013.01); *H04W 4/203* (2013.01); *G06F 3/00* (2013.01)

(58) Field of Classification Search
CPC ...................................................... H04W 4/06
See application file for complete search history.

(56) References Cited

U.S. PATENT DOCUMENTS

| | | | |
|---|---|---|---|
| 7,962,128 B2 | 6/2011 | Neven et al. | |
| 2010/0260373 A1* | 10/2010 | Neven .................... | G06K 9/228 382/100 |

(Continued)

FOREIGN PATENT DOCUMENTS

| | | |
|---|---|---|
| WO | WO1992017002 | 9/1992 |

*Primary Examiner* — Joseph Feild
*Assistant Examiner* — Pameshanand Mahase (57) ABSTRACT

Proposed is a method for retrieval of unrecalled AD which was missed by the viewer from fixing it in a specific APP by pushing an activation button on the mobile electronic device at the time of visual demonstration seen by the viewer. The method consists of the opening an owner's account on the Internet server linked with the APP; composing a listing of the sequential groups of the visual digital signals; activating the system within a certain time "t" after completion of a selected portion of the series of digital signals which includes the AD being sought, reproducing the listing of the sequential groups of visual digital signals on the mobile electronic communication device, selecting a group that corresponds to the unrecalled AD; and reproducing the selected group on the mobile electronic communication device for viewing the unrecalled AD.

11 Claims, 7 Drawing Sheets

(56) References Cited

U.S. PATENT DOCUMENTS

| | | | |
|---|---|---|---|
| 2011/0035284 A1* | 2/2011 | Moshfeghi | G06Q 30/02 705/14.58 |
| 2011/0307786 A1* | 12/2011 | Shuster | G06F 17/30817 715/723 |
| 2013/0159086 A1* | 6/2013 | Richard | H04W 4/02 705/14.33 |
| 2014/0162706 A1* | 6/2014 | Daly | H04W 4/12 455/466 |

* cited by examiner

Data Input Required For A Listing

| MM:DD:YYYY:HH:MM:SS Duration Landing Page Related Info |
|---|
| MM:DD:YYYY:HH:MM:SS Duration Landing Page Related Info |
| MM:DD:YYYY:HH:MM:SS Duration Landing Page Related Info |

Nearzilla Listings: Bounded List

Value Bound (Time):
Unrecalled = Current Time Stamp – Duration, e.g., 30 secs

Volume Bound (Size):
Listing Size = Max (m,n), e.g., max (3,1)

Fig. 7

METHOD FOR RETRIEVAL OF UNRECALLED INFORMATION FROM DIGITAL ADVERTISEMENT

RELATED APPLICATIONS

This application claims priority to U.S. Provisional Application No. 62/328,454 filed Apr. 27, 2016, entitled "REVIVAL OF UNRECALLED INFORMATION FROM DIGITAL ADVERTISEMENT".

FIELD OF THE INVENTION

This disclosure relates to retrieval of unrecalled information from a digital advertisement. More specifically, the invention relates to a mobile-application network for retrieval of unrecalled information from a digital advertisement by using a mobile application that wirelessly communicates with a content source. The mobile application network of the invention can be used in a case when a user could not fix a particular piece of AD running in a loop for the reason of lack of time, bad environmental conditions, inconvenient position of a vehicle relative to the content source, etc.

DESCRIPTION OF THE PRIOR ART

At the present time, a visual digital information is frequently delivered to users having smart electronic devices through visual access to digital displays, e.g., billboard displays, TV screens, or the like. Since in many cases a user has a limited time for observing and memorizing the information that draw his/her attention, the user misses a moment at which he/she may memorize the expired information. As a rule, the visual digital information shown on a digital billboard, digital TV etc., is transmitted in a Digital Out-Of-Home (DOOH) system which contains AD information recorded in a loop format with a periodic repetition of the sequential AD units. For example, PQ Media (a leading provider of global media econometrics and pioneer of emerging media research) defines the DOOH by two major platforms, digital place-based networks (DPN) and digital billboards & signage (DBB); the DOOH networks typically feature independently addressable screens and kiosks. The DOOH media benefits location owners and advertisers alike in being able to engage users and/or audiences and extend the reach and effectiveness of marketing messages. It is also referred to as "Digital Signage".

For example, running of the entire loop may take 1 minute and may consist of six 10 seconds AD units. Thus, if the user failed to remember the current AD unit in which he/she is interested, he/she will see the next irrelevant AD unit and have to wait, e.g., for another 50 seconds to have access to the AD they're interested in. This is practically inconvenient if the user is driving in a car passing the information source. In case the information is not in a loop format, such an information may be not accessible at all.

In order to solve the above problem, the inventors herein have developed a mobile application network which makes it possible to retrieve the unrecalled information. The network consists of a mobile APP preliminarily downloaded to a mobile electronic communication device (such as a smart a mobile phone, tablet, iPad, etc.) and visible on the screen of the mobile electronic communication device in the form of a unique icon, and a database that stores the AD's information recorded at predetermined time intervals and in an appropriate format.

For example, the visual digital information displayed on the signage is presented in the following formats:
Images—Scrolling images, usually in the format of digital advertisement posters;
ADs rotate in a slide show fashion every 6 to 8 seconds every 60 seconds' loop;
Video—Usually in the format of commercial TV advertisements.

A typical digital signage such as a billboard has eight slots in a loop, each 8 to 10 second long.

Technique for retrieval of a missed digital content is known in the art.

For example, US Patent Application Publication No. 20110307786 (inventor: Brian Shuster; published: Dec. 15, 2011) discloses a method for bookmarking and retrieval of video content. The method involves sampling via a microphone an audio segment from a broadcasted audio/video content received on an audio/video device, converting the sampled audio segment to digital data, receiving a signal to set a bookmark, and transmitting the digital data to a storage device with identifying information for the video stream. The method also provides for retrieving a stored video stream by receiving a request to retrieve a stored video content, the request including an audio fingerprint, searching a database including the previously stored video streams to locate an audio fingerprint within the video stream which matches the audio fingerprint of the request, determining a location within the stored video stream corresponding to the matched audio fingerprint, and streaming the video stream from the determined location.

U.S. Pat. No. 7,962,128 issued to Hartmut Neven, et al. on Jun. 14, 2011 discloses an image-based information retrieval system, including a mobile telephone, a remote recognition server, and a remote media server, the mobile telephone having a built-in camera and a communication link for transmitting an image from the built-in camera to the remote recognition server and for receiving mobile media content from the remote media server, the remote recognition server for matching an image from the mobile telephone with an object representation in a database and forwarding an associated text identifier to the remote media server, and the remote media server for forwarding mobile media content to the mobile telephone based on the associated text identifier.

International Patent Application Publication WO 1992017002 published on Sep. 16, 1992 (inventors: Ernest Conway, et al.) discloses a communication system that uses simple microwave transmitters disposed along roadways and in-vehicle mounted receivers to transmit encoded signals to produce location-specific commercial, traffic regulatory, emergency and other information to operators of motor vehicles. An optional remote interface links transmitters to regulatory and commercial users in real-time. A microprocessor in the receiver uses the coded signals to produce messages from prerecorded messages or from message parts stored in a replaceable memory device, and to provide the messages either audibly, visually or both. The microprocessor functions under operator supplied instructions to select certain message types for display and to reject unwanted messages. The memory device is recorded in one or more languages to allow the operator to select a preferred language for message presentation.

U.S. patent application Ser. No. 14/937,031 filed on Nov. 10, 2015 (inventor: I. Anikina) discloses obtaining information from a network source with limited access.

A mobile communications device is configured to detect one or more radio signals emitted by local Wi-Fi routers and the unique identifier associated with each Wi-Fi router. The mobile communications device searches for the unique identifier in a database of registered Wi-Fi routers. If the unique identifier is found in the database, then content including a resource locator is retrieved and displayed. When the resource locator is selected, the mobile communications device is redirected to the resource locator.

SUMMARY OF THE INVENTION

The present invention relates to a method for retrieval of unrecalled Information from a digital advertisement, and more specifically, to a mobile application network for retrieval of an unrecalled information from a digital advertisement (hereinafter AD) by using a mobile application that wirelessly communicates with a content source.

In the context of the present specification, the term "unrecalled information" means a visual digital information in the form of digital signals which a user could not, for some reason (traffic situation, etc.), catch through the respective APP, which was preliminarily downloaded into his/her smart electronic device, by touching the APP launch icon or by a voice command. The purpose of this invention is to facilitate the search and retrieval of the missed information at a later time.

The applicants base their invention on the following principles (the numbers are examples):
1) We are mainly searching for those digital ADs which have been shown earlier and not the current digital AD which is exposed on the digital display at the present time.
2) It is assumed that the timeframe sought in the AD database practically does not exceed 30 seconds, or the like after the AD was aired. In other words, we are searching for expired ADs which were aired from a source that visually reproduces sequential groups of digital signals, which have been shown for the last 30 seconds or the like after the exposure and which constitutes a searchable group of digital signals. Such a source of sequential groups of digital signals may be exemplified by a screen of a digital billboard or a TV set, etc.
3) If duration of an AD exceeds 30 seconds, or the like, the system is searching only the AD which was shown or transmitted last.
4) Another condition is that only a limited number of ADs, e.g., maximum of the three previous ADs should be shown.

In order to implement the method of the invention, the DOOH Location Owner has to preliminarily open a DOOH network account that utilizes GPS, or other sub-accounts on the Internet Server linked to the APP. These steps were disclosed in U.S. patent application Publication Ser. No. 14/937,031 filed on Nov. 10, 2015.

DETAILED DESCRIPTION OF THE INVENTION

Before explaining the principle of the invention, the inventor herein wants to make some excursus to the behavior of the USPTO regarding software-related patent applications which are rejected in majority of cases, especially if the application is directed to a result or effect that itself is the abstract idea. However, in three recent 2016 decisions the Federal Circuit upheld the validity of software patent claims. First, in *Enfish, LLC v. Microsoft Corporation* decided on May 12, 2016, the Federal Circuit held that patent claims directed to a fast searching of data in a computer database are "not directed to an abstract idea within the meaning of Alice . . . because they are directed to a specific improvement to the way computers operate . . . ". Thus, the Federal Circuit decided that the invention was patent eligible under the first step. The Enfish case therefore tells us that a software invention may be patent eligible if it improves the way a computer operates. Under this reasoning, software inventions, for example, for optimizing a computer memory or detecting a computer virus are likely to survive Alice challenges.

In the case of improvement disclosed in software-related patents, such an improvement may add something to an existing product, incorporate new technology into an old product, or find a new use for an existing product or processes.

In view of the above, the present invention, which relates to a method for retrieval of unrecalled information from digital advertisement, can be qualified as an improvement invention that facilitates, simplifies, and accelerates recall of a visual digital information which under certain circumstances could not be retrieved on time.

See: materials posted in the Internet on Sep. 13, 2016 by Erich Andersen—Corporate Vice President and Chief IP Counsel of Microsoft's Intellectual Property Group (Federal Circuit rules on software patent eligibility).

If the user of a mobile electronic communication device, such as a smart phone, tablet, or the like, wishes to obtain content or information on the basis of a visual logo indicating that the mobile application network is available, the user must first download and install the mobile network application into his/her mobile device. As a part of the installation process, an appropriate icon or logo associated with the downloaded network application will appear on a display screen of the mobile electronic communication device.

The above detailed information describes the known steps of opening the respective DOOH owner's account on the Internet server (see aforementioned U.S. patent application Ser. No. 14/937,031). These steps have to precede the use of the method of the invention.

The method of the invention is intended for use not only in connection with (digital billboards, but also in connection with specific TV APPs, TV remote control APPs, or the like.

As an example, the method of the invention will now be described with reference to FIG. 1 which shows a vehicle V running on the road R with the speed S in the direction of arrow the arrow and passing by a billboard BB which shows a certain AD, or a series of ADs. Let us assume that during driving the driver of the vehicle V looked at the billboard BB and saw an AD that caught his/her attention when the vehicle is located at point P1. However, at this specific moment the driver could not for some reason (traffic situation, etc.)

launch and control the respective APP, which was preliminarily downloaded into his/her smart electronic device by touching the APP launch icon or by a voice command. Let us assume that the user could do this when the vehicle already reached point P2 and passed by point P3 in which billboard BB is located. Let us assume that the point P3 is located in the center of the billboard BB. It is understood that when the driver activated the APP the billboard may show one or more additional ADs that followed the one in which the user was interested.

The activation of the respective APP also activates searching for GPS coordinate signals and finds a geo-fencing contour that defines the geographical zone of the road where the vehicle is located. A geo-fence is a virtual perimeter for a real-world geographic area. A geo-fence could be dynamically generated—as in a radius around a store or point location, or a geo-fence can be a predefined set of boundaries, or the like. Such a geo-fencing contour is shown in FIG. 1 by dash-and-dot lines. Thus, it would be possible to detect the moment when the vehicle was in the APP activation zone and thus to fix the moment when a series of sequential ADs, including the sought AD, was shown on the screen of the digital billboard. Since all these ADs are saved in a History of the APP they can be reproduced from Apps History at the time convenient for the user. Alternatively, the incoming information chosen by the user could be automatically read aloud to keep the driver/user in touch. It is understood that for the when the user is located in a vehicle that passes the source of the digital AD the method of the invention may be realized only when the user is located within the boundaries of the geo-fencing contour. Otherwise the user may get information from another billboard having the logo of the same APP with another unrecalled AD which is not needed. It should be taken into account that a location of this billboard can be identified only by GPS coordinate signals. The interaction of the APP with the GPS communication systems is shown in the attached drawings where FIG. 2 is a flowchart of operations that occur in the DOOH system of the invention. It is understood that for implementation of the system of the invention the user has to preliminarily download the respective DOOH mobile APP (which in some places of the specification is referred to merely as "mobile APP") into his/her smart electronic device such as smart telephone, tablet or the like. When the user sees, e.g., on the digital billboard (or on the screen of the TV, etc.) the information of interest in combination with the logo of the aforementioned DOOH mobile APP, he/she taps on this logo in his/her mobile device. The DOOH mobile APP is searching for the GPS coordinates of the mobile device in use.

Upon retrieval of the GPS coordinate signals, the APP of the mobile device is connected to the Database. Next, the DOOH mobile APP begins to search for the DOOH Location Owner and then locks the time of the request with the current Database which finds and retrieves the loop of the information shown on the digital billboard, TV screen, or the like, at the time of connection of the mobile device with the Database. The DOOH Location Owner provides access to the following information shown on the right side of FIG. 2: (A). GPS Info for Geofencing, i.e., 1. Display's GPS coordinate signals; 2. Speed Limit; 3. Maximum Noting Distance; 4. Road Type; 5. Side of Road; 6. Distance to Road; 7. Format (structure type); 8. Display Format; 9. Angular position of the digital billboard relative to the direction of the road; etc.

All these data are transmitted to the Database of the DOOH mobile APP.

The next step is searching through the Database for unrecalled AD sought by the user. The list of the expired ADs is returned to the user and the obtained list of the expired ADs is saved in the History of the mobile device. After selecting the sought unrecalled AD, the user is redirected to the URL associated with this AD.

Figure 3:
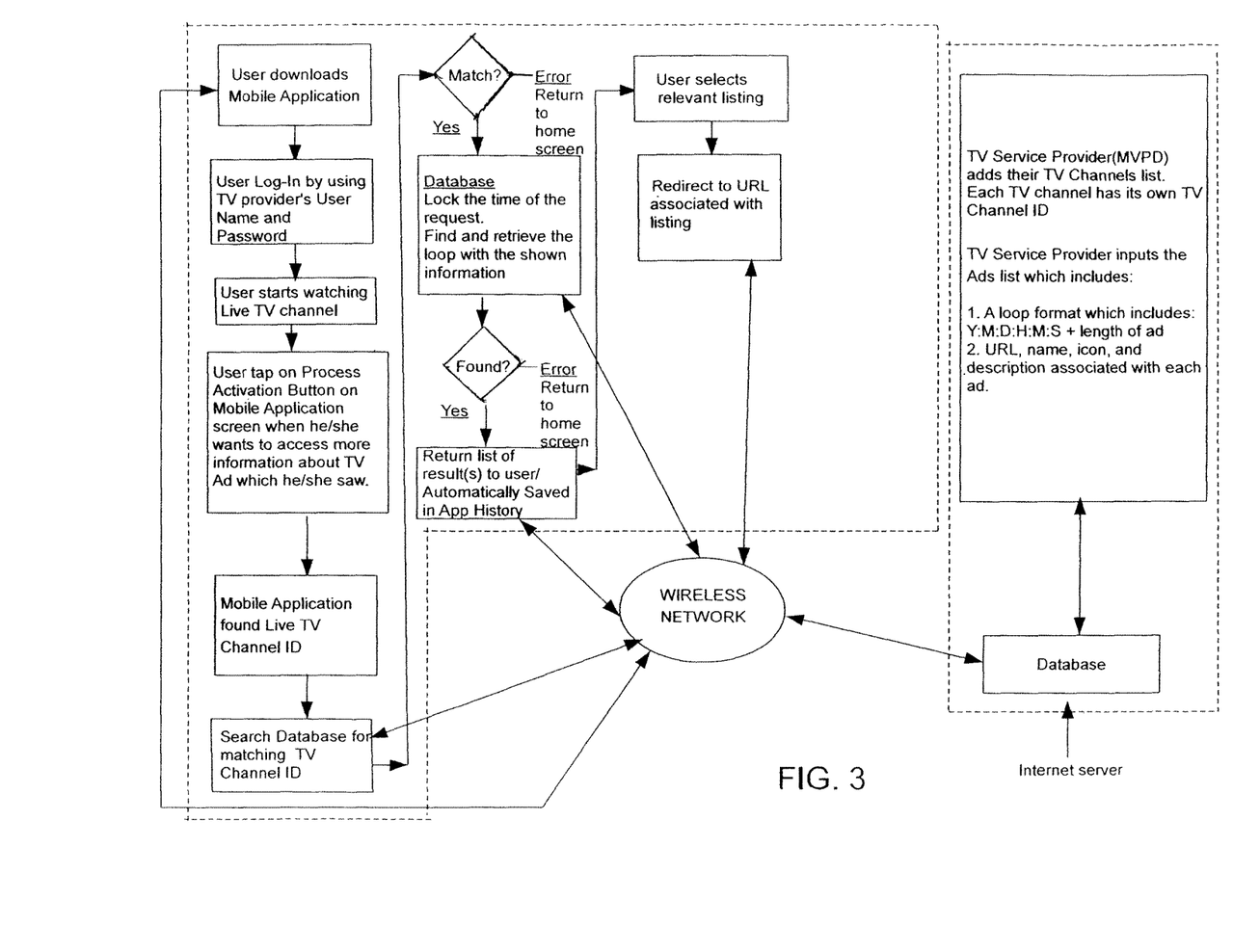
FIG. 3 shows a flowchart of events that occur when the user is looking for an expired visual digital information, e.g., a digital TV AD shown in the TV APP.

FIG. 3 shows a flowchart of events that occur when the user is looking for an expired visual digital information, e.g., a recently played digital TV AD or the like. The sequence of steps that occurs in searching the unrecalled TV AD is shown in FIG. 3.

Figure 4:
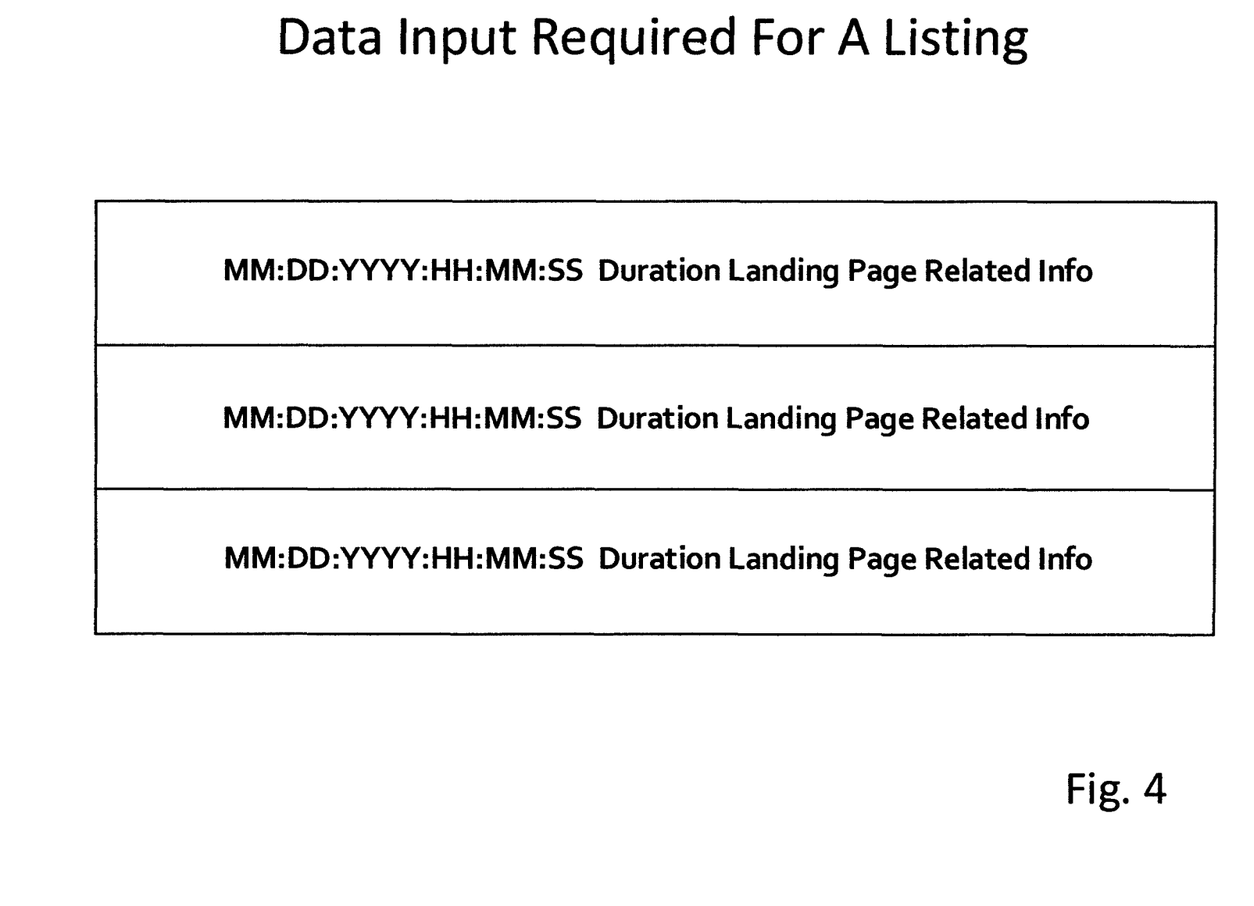
FIG. 4 shows input of the data required for a listing.
Figure 5:
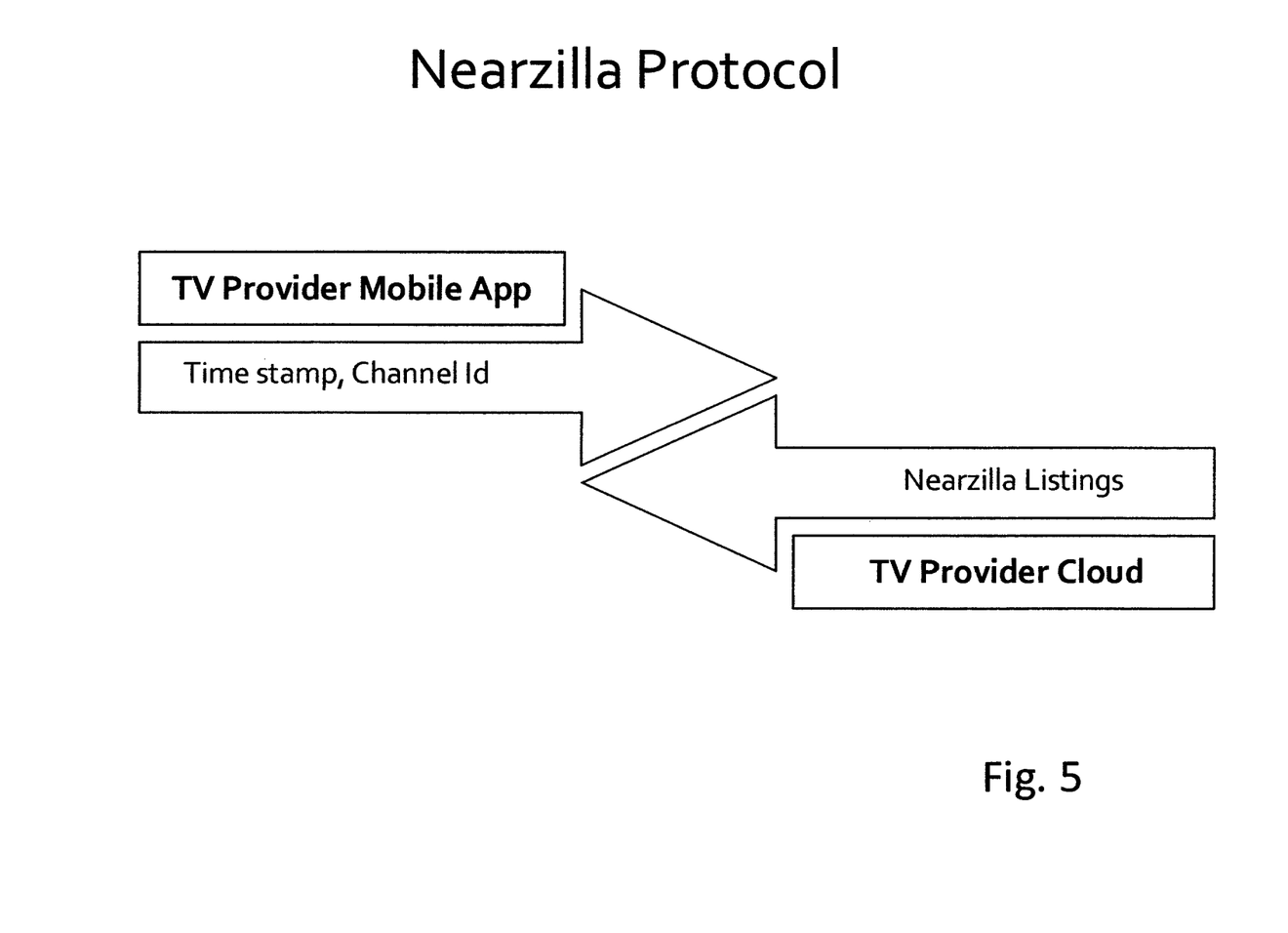
FIG. 5 shows a process that occurs when a user taps on the APP's logo button (hereinafter referred to as Process Activation Button) to retrieve listing.
Figure 6:
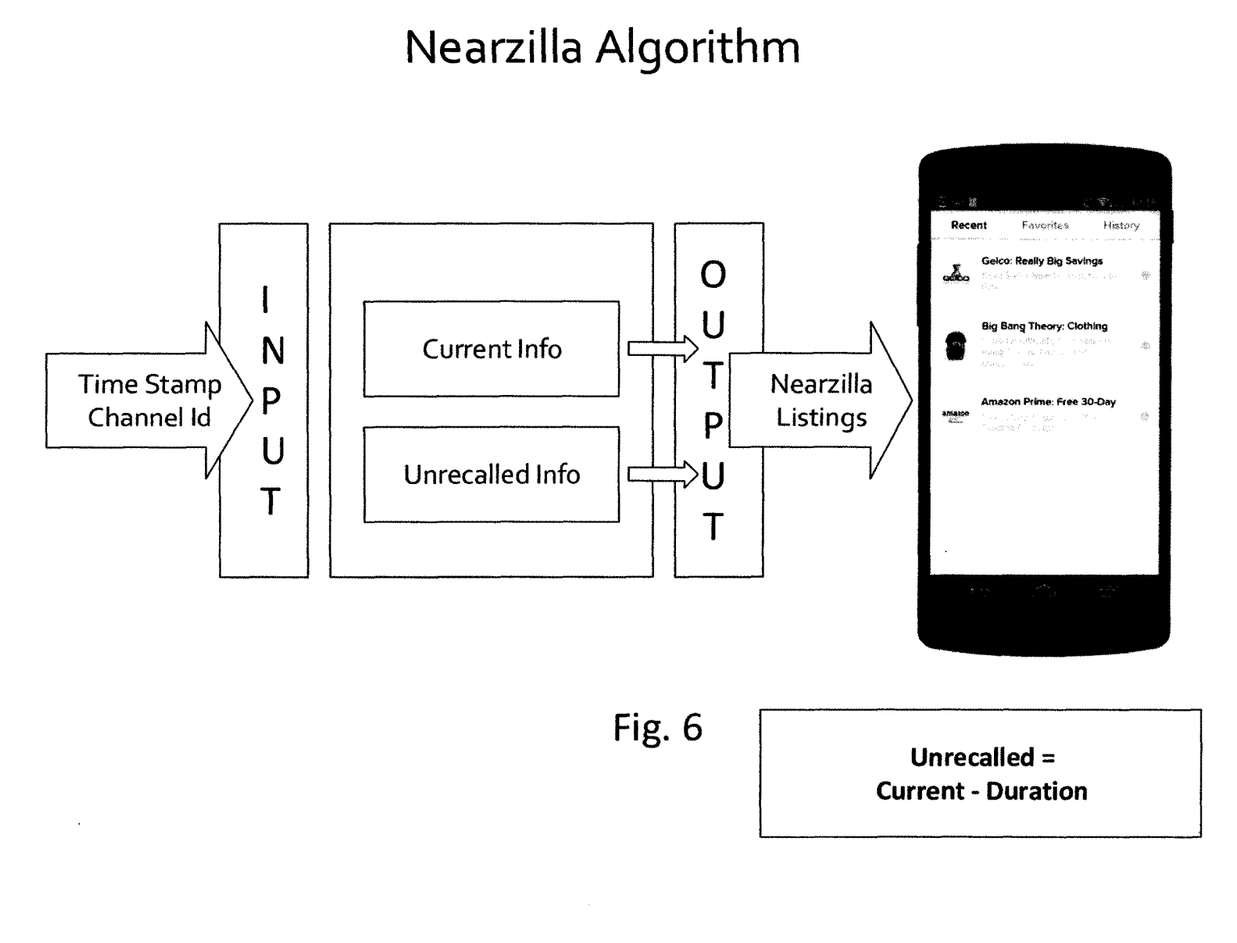
FIG. 6 shows an APP's Algorithm.
Figure 7:
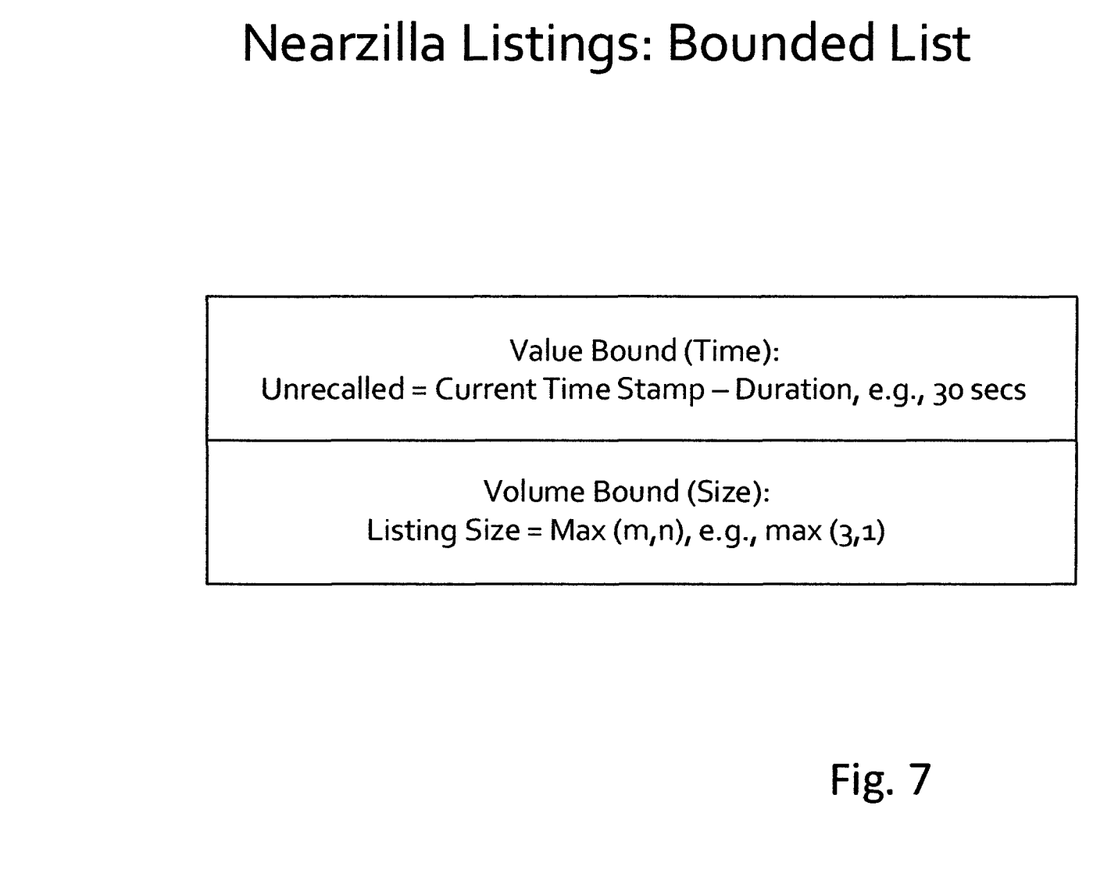
FIG. 7 shows the APP's listing (Bounded List).

In a more simplified form the steps that occur in the flowchart shown in FIG. 3 can be illustrated by FIGS. 4, 5, 6, and 7, wherein FIG. 4 shows input of data required for a listing, FIG. 5 shows a process that occurs when a user taps on the Process Activation Button, which may be a touchable button, to retrieve listing, FIG. 6 shows an APP's Algorithm, and FIG. 7 shows the APP's listing (Bounded List).

Given below is explanation of the terms used in FIGS. 4 to 7.

Time Stamp (Month, Day, Year, Hour, Minute, Second) specifies WHEN the listing will be available. Example: 04:05:2017:18:30:00=Apr. 5, 2017, 6:30.

Duration specifies how long the listing is the top result in the retrieved listing page before it is bumped down into the second, third, fourth, etc. position.

Example: Listing #1 has a duration of 15 seconds (and a time stamp of 04:05:2017:18:30:30), Listing #2 has a duration of 15 seconds (and a time stamp of 64:05:2017:18:30:45). Listing #1 will be top result of the retrieved listing page when a user taps on the PPT touchable button (after . . . 18:30:30 but before . . . 18:30:45), but if a user taps on the touchable PPT button during Listing #2's duration time, then Listing #2 will now be the top result, and listing #1 will move down to the second result. Each listing moves down in ranking from #1 based on their respective duration time & time stamp.

Landing page (URL) specifies where a user is re-directed after the/she taps on the listing. Example: "Amazon.com".

Related info specifies the description of the listing. Example: "You can get unlimited FREE Two-Day Shipping on eligible items with Amazon Prime."

In the drawings, Nearzilla is an exemplary name of the system built for carrying out the process of the present invention.

(Nearzilla Protocol—FIG. 5)

The process occurs when a user taps on the Process Activation Button to retrieve listings.

TV Provider Mobile App—When a user taps on the Process Activation Button, the MVPD's (Multichannel Video Programming Distributor such as Comcast, Charter, etc.) (which in some places hereinafter is referred to mere as "mobile APP") sends a query to their server to retrieve listings based on the following parameters:

Time stamp—Time record (MM:DD:YY:etc.) of when the user tapped the Process Activation Button Channel ID—A channel the user was watching when he/she tapped the Process Activation Button. Server returns the relevant listings, which is then displayed in a list format within the mobile app.

(Nearzilla Algorithm—FIG. 6)

This is an extension of the information in FIG. 5. The retrieved listings include the most recent listing (based on Timestamp, Channel ID, & Duration, as well as earlier listings (in the sense that their duration time has passed, and their ranking has been moved down).

Current Info=Listing associated with the currently playing TV advertisement

Unrecalled info=Listings associated with TV advertisements that was aired BEFORE the currently playing advertisement (Nearzilla Listings: Bounded List—FIG. 5)

Listings can be displayed based on two ways: Displays ALL listings within a period of time (Value Bound—Time) or a SET number of listings (Volume Bound—Size) within a period of time.

Value Bound (Time): Retrieve all listings based on the Real Time—a set duration "t" (example: 3 minutes)

Ex. 10:30:00-00:03:00. So, all listings that were set to be available during that time span (10:27:00 to 10:30:00) will be retrieved and displayed. This includes the Current-Time listing (at 10:30:00) as well as listings before the real time (Up to 10:27:00)

Value Bound (Time) is used when there are many advertisements (therefore listings) within a period of time.

Volume Bound (Size): Retrieve a MAX/MIN number of listings:

This is used to set a minimum and maximum number of listings that are displayed. For example, Maximum of 3 listings OR a minimum of 1 listing E., g., there were only 2 advertisements within the last 30 minutes on a specific channel. A user taps on the button or to retrieve the relevant listings, and will only retrieve those two (2)

Volume Bound (Size) MIN is used when there is a limited amount of advertisements (therefore listings) within a period of time.

Thus, the method of the invention has been shown and described with reference to specific description and drawings. It should be understood, however, that the application of the invented method is not limited to the provided examples and that various changes and modifications are possible within the scope of the attached claims.

Figure 1:
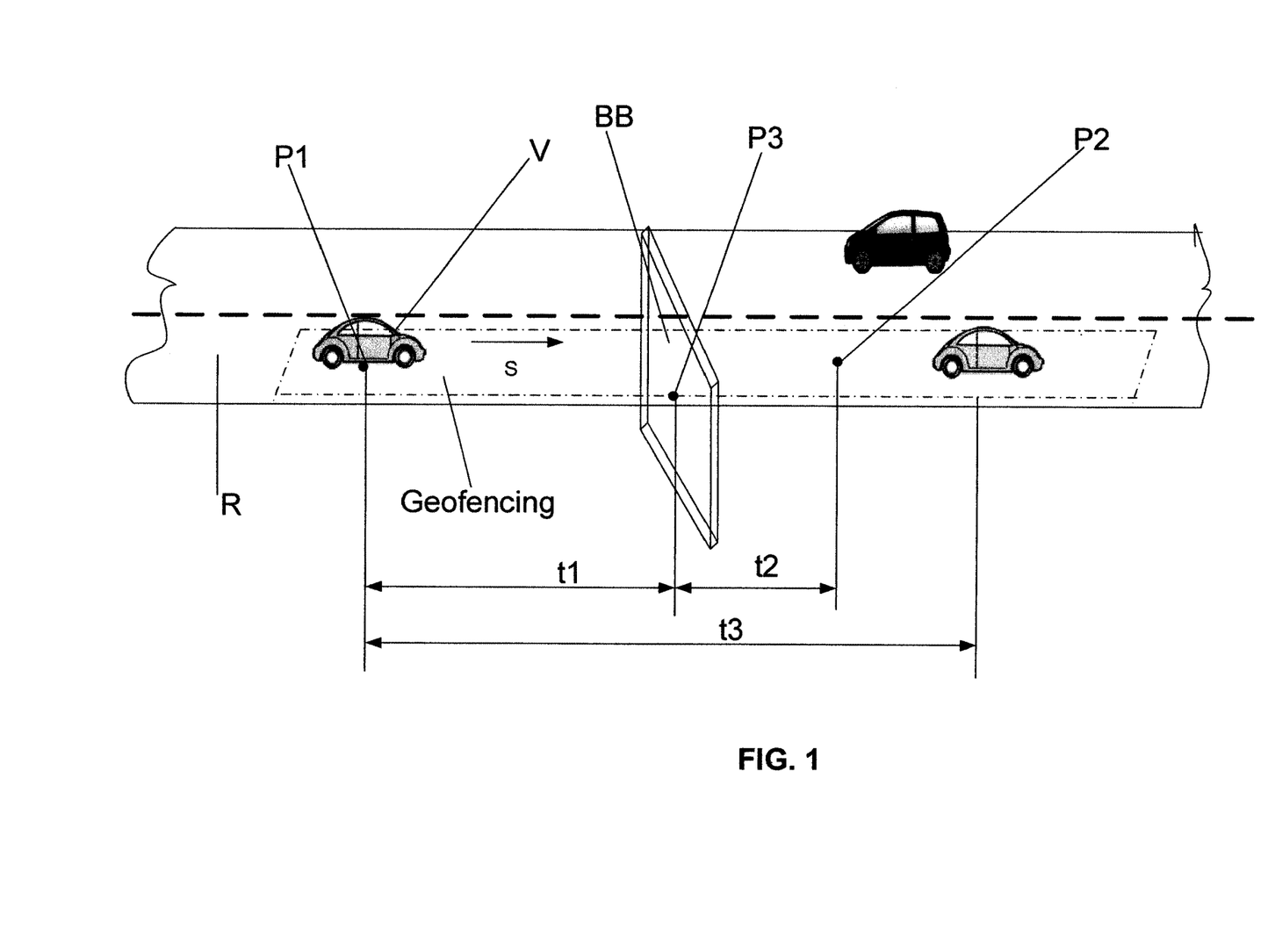
FIG. 1 is a view that shows a vehicle running on the road and passing a billboard which shows a certain AD or a series of Ads.
Figure 2:
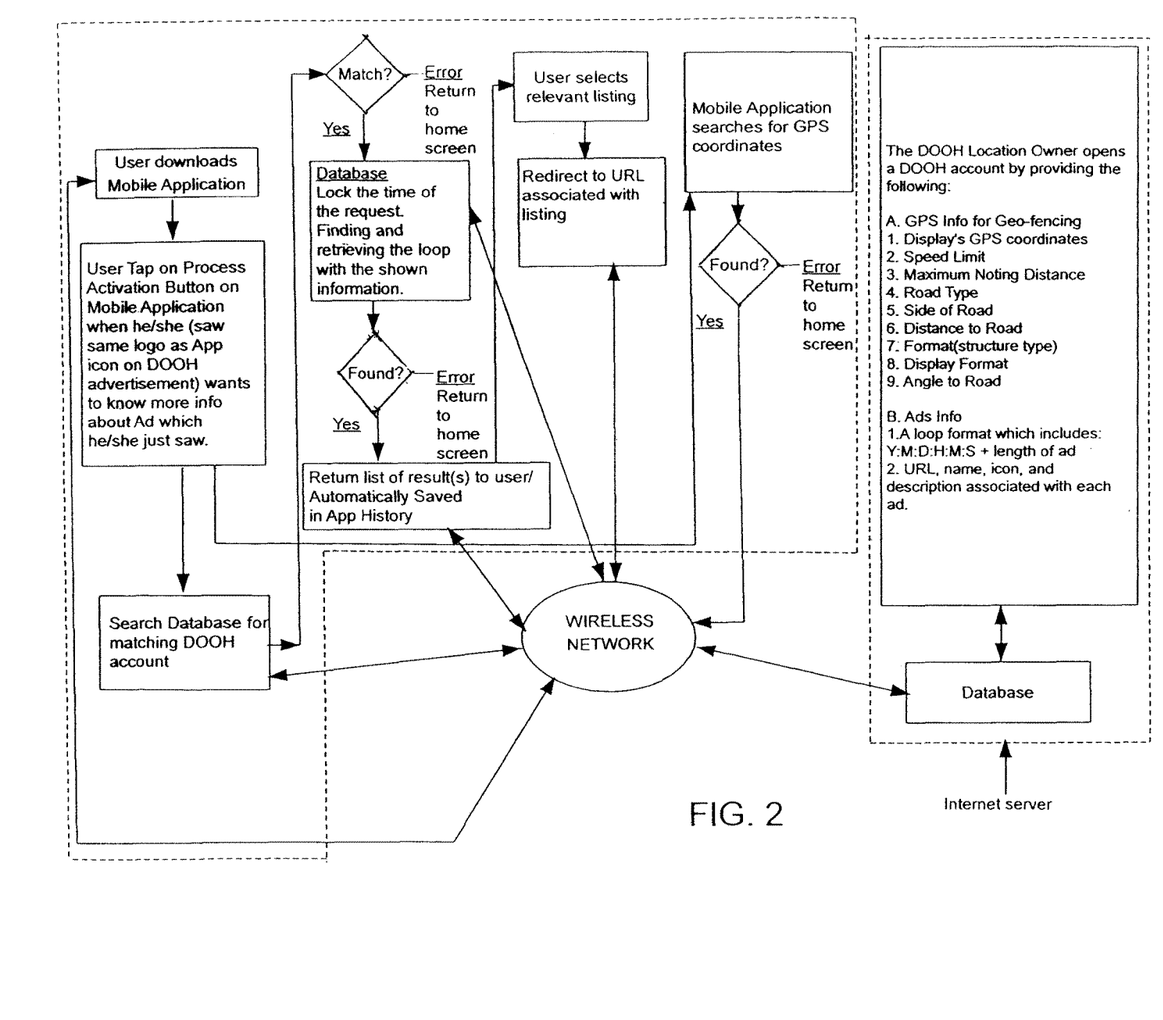
FIG. 2 is a block diagram that shows the interaction of the APP with the GPS communication systems that occurs in the DOOH system of the invention.

Although the description and positions of the vehicles shown in FIG. 1 relates to a vehicle traveling on one side of a two-way road or high-way in one direction, the same may relate to vehicles traveling at the same or a different time on the other side of the road or highway in the opposite direction. This is because the billboard may be a two-sided billboard that may transfer the same or different information on both sides simultaneously. It is also understood that the user is not necessarily the driver or passenger. Such automatic recording of the related ADs occurs when the vehicle and hence the mobile device are located in the geo-fencing zone. This means, that the information is automatically recorded in the History and can be extracted at any time later. The APP is an example and the APP can be replaced by a browser, or the like. In addition, we can set a 'virtual billboard' within the geo-fence in proximity to the physical billboard. The virtual billboard is essentially a set of GPS coordinate associated with an advertisement or advertisements, which will appear in the user's APP (when a user activates the Process Activation means by a voice command or by tapping on a touchable button), in addition to the advertisement wirelessly retrieved from the digital signage and/or TV. Listing(s) from virtual billboards will be identified as such in the mobile APP.

Thus it has been shown that the method of the invention for retrieval of unrecalled AD from a visual digital information involves the use of a system that, among other things, contains at least a source that reproduces sequential groups of visual digital signals, a server for registering said sequential groups of visual digital signals, and the time when said sequential groups of visual digital signals were visually reproduced; a mobile electronic communication device; an APP that links the mobile electronic communication device with said sequential groups of visual digital signals registered by the server.

The method consists of providing the mobile electronic communication device with a system activation button for activating operation of the system; opening a DOOH location owner's account on the Internet server linked with the APP; composing a listing of the sequential groups of the visual digital signals; activating the aforementioned system activation button within a certain time "t" after completion of a selected portion of the series of digital signals; reproducing the listing of said sequential groups of visual digital signals on the mobile electronic communication device and selecting a group that corresponds to the unrecalled AD; and reproducing the selected group on the mobile electronic communication device.

The invention claimed is:

1. A method for retrieval of unrecalled advertisement from a visual digital information comprising the steps of:

providing a system comprising: a source that visually reproduces the advertisement in the form of sequential groups of visual digital information signals, an Internet server having a database for registering said sequential groups of visual digital information signals, in a moment when said sequential groups of visual digital information signals were visually reproduced; a mobile electronic communication device; an application that links the mobile electronic communication device with said sequential groups of visual digital information signals registered by the Internet server;

providing the mobile electronic communication device with a system activation means for activating operation of the system;

opening an owner's account on the Internet server linked with the application;

composing listings of said sequential groups of the visual digital signals, wherein for each moment, when said sequential groups of visual digital information signals were visually reproduced, each listing is presented in the form of MM:DD:YYYY:HH:MM:SS, where MM designates a month, DD designates a day, YYYY designate a year, HH designates an hour, MM designates a minute, and SS designates a second;

activating said system activation means within a certain time "t" after completion of a selected portion of said series of digital signals, which corresponds to the unrecalled advertisement that is to be retrieved;

reproducing the listings of said sequential groups of visual digital signals on the mobile electronic communication device and selecting a group that corresponds to the unrecalled advertisement; and wirelessly retrieving from the listings visual digital information signals recorded in the database during said certain time "t".

2. The method of claim 1, wherein the system activation means is selected from the group consisting of a voice command and a touchable button.

3. The method of claim 2, wherein the selected source that visually reproduces sequential groups of visual digital information signals is one of a Digital Out-of-Home (DOOH) System and a TV screen.

4. The method of claim 3, wherein the step of registering said sequential groups of visual digital information signals and the time when said sequential groups of visual digital information signals were visually reproduced is carried out by locking in the database the time when the system activation means were activated.

5. The method of claim 3, wherein when the mobile electronic communication device travels relative to the source of sequential groups of visual digital information signals, a position of the mobile electronic communication device is determined in terms of GPS coordinates within the boundaries of a geo-fence defined by the GPS and the coordinates of the geo-fence are recorded in the database of the Internet server.

6. The method of claim 1, wherein when the mobile electronic communication device travels relative to the source of sequential groups of visual digital information signals, a position of the mobile electronic communication device is determined in terms of GPS coordinates within the boundaries of a geo-fence defined by the GPS and the GPS coordinates of the mobile electronic communication device are recorded in the database of the Internet server.

7. The method of claim 1, wherein the certain time "t" is in the range of 0.1 to 50 seconds.

8. The method of claim 1, wherein the system activation means is activated when the mobile electronic communication device is detected in an activation zone.

9. The method of claim 8, wherein identifying a time when the device is in the activation zone enables fixing a moment when a series of sequential advertisements, including a sought advertisement, was displayed.

10. The method of claim 1, wherein a user preliminarily installs a Digital Out-Of-Home (DOOH) application on the mobile electronic communication device.

11. The method of claim 1, wherein a user preliminarily installs a TV Provider application on the mobile electronic communication device.

* * * * *